United States Patent
Kirkwood

[11] Patent Number: 6,045,112
[45] Date of Patent: Apr. 4, 2000

[54] VIBRATION ISOLATION SYSTEM FOR AN ELECTRIC MOTOR

[75] Inventor: Robert Clark Kirkwood, Plymouth, Mich.

[73] Assignee: Calsonic North America, Inc., Farmington, Mich.

[21] Appl. No.: 09/045,251

[22] Filed: Mar. 20, 1998

Related U.S. Application Data

[63] Continuation-in-part of application No. 08/915,478, Aug. 20, 1997.

[51] Int. Cl.[7] .................................................... H02K 5/00
[52] U.S. Cl. ............................ 248/634; 248/638; 248/674; 310/51; 310/91
[58] Field of Search .................................. 248/674, 638, 248/634, 603; 310/51, 91

[56] References Cited

U.S. PATENT DOCUMENTS

| | | | |
|---|---|---|---|
| 3,941,339 | 3/1976 | McCarty . | |
| 4,566,865 | 1/1986 | Nishitsuji et al. | 248/674 X |
| 4,648,579 | 3/1987 | Wilson | 248/638 |
| 4,768,925 | 9/1988 | Geupel | 248/638 X |
| 4,819,503 | 4/1989 | Fazi, Jr. et al. | 248/638 X |
| 5,069,413 | 12/1991 | Carson et al. | 248/638 |
| 5,112,024 | 5/1992 | Stanko | 248/638 X |
| 5,126,607 | 6/1992 | Merriman, Jr. | 248/638 X |
| 5,366,198 | 11/1994 | Dickinson | 248/550 |
| 5,533,704 | 7/1996 | Fischinger et al. | 248/603 |

*Primary Examiner*—Derek J. Berger
*Attorney, Agent, or Firm*—Jordan M. Meschkow, Esq.; Lowell W. Gresham, Esq.; Meschkow & Gresham, P.L.C.

[57] ABSTRACT

A vibration isolation system (20) reduces vibrations produced by an operating electric motor (22). A motor retainer ring (24) fits into a motor retaining ring isolator (40) which is placed into a mounting surface opening (52) such that protrusions (48) contact a mounting surface (50). An upper motor cover (54) and a lower motor cover (60) are positioned to surround motor (22) while protruding ridges (62) space the interior surface away from motor (22). Fasteners (32) fit through retainer mounting holes (30) and attach to threaded holes (38) such that protrusions (58) of the upper motor cover (54) contact the mounting surface (50).

8 Claims, 3 Drawing Sheets

VIBRATION ISOLATION SYSTEM FOR AN ELECTRIC MOTOR

RELATED PATENTS

This application is a continuation-in-part of Ser. No. 08/915,478, filed on Aug. 20, 1997, entitled "Vibration Isolation System For An Electric Motor", by Robert Clark Kirkwood, which is incorporated herein by reference.

TECHNICAL FIELD OF THE INVENTION

The present invention relates generally to the field of vibration isolation. More specifically, the present invention pertains to a vibration isolation system for an electric motor.

BACKGROUND OF THE INVENTION

An operating electric motor produces radial and axial vibrations. Many applications attach the electric motor to a mounting surface that supports and holds the motor in a specific location for a system installation. When the electric motor is so installed, vibrations from the operating motor are transmitted from the motor to the mounting surface by the surface area that is common to the motor and the mounting surface. The mounting surface then transmits these vibrations to other connecting surfaces and fasteners in the system installation. Vibrations from the operating motor that are transmitted to the mounting surface tend to loosen nuts, bolts, screws and other fasteners or connectors that are used in connecting and assembling the system installation. This loosening of fasteners and connectors can adversely effect the system installation.

Motor induced vibrations cause other undesirable effects as well. For example, vibrations from the operating motor and those transmitted by the motor mounting surface can produce an audible noise. In the case of a fan motor mounted to a ducted ventilating system, the generated noise is often transmitted through the ventilating ducts. At a minimum, this noise is distracting and annoying to individuals near the ducting system.

Conventional methods for reducing the transmission of vibrations from an operating electric motor attempt to isolate the motor from the mounting surface by using various vibration isolation systems. One such system uses several mounting screws with washers to attach a motor with an integral motor flange to the mounting surface. The mounting surface has several bosses configured to accept a vibration isolating grommet having a grommet insert or bushing inside. The motor flange is configured to fit around the mounting surface bosses. The mounting screws pass through the grommet inserts, and attach to the mounting surface while the mounting screw washers contact and hold the isolating grommets and the motor flange to the mounting surface. Unfortunately, this vibration isolation system has a significant amount of surface area common to the motor flange and the mounting. The common surface area acts as a medium through which motor vibrations are transmitted to the mounting surface. Moreover, aligning and installing such an isolating system can be cumbersome and time consuming when more than two mounting screws are required for installation.

Another conventional vibration isolation system locates the motor inside a rigid housing having a flanged opening and a closed end with at least two retaining holes. The motor has at least two retaining holes in a surface opposite its drive shaft surface. The motor is positioned inside the housing such that the drive shaft of the motor extends through the flanged opening of the housing and at least two retaining screws pass through the housing retaining holes and attach to the motor retaining holes. Typically, vibration isolation material is located between the rigid housing and the mounting surface. The housing is attached to the mounting surface using any of a variety of fastening means such as conventional mounting screws, nuts and bolts and the like. Unfortunately, this vibration isolation system also has a significant amount of surface area common to the rigid housing and the mounting surface. Even though vibration isolating material is located between these two surfaces, this common surface area still acts as a medium to transmit motor vibrations to the mounting surface.

Typically, these conventional vibration isolation systems do not significantly reduce motor induced vibrations and tend to increase the total cost, weight and overall package size of the installed system. For most system installations, even a modest increase is undesirable.

Accordingly a need exists for a low cost, lightweight, vibration isolation system that significantly reduces the transmission of vibrations from an operating electric motor without significantly increasing the overall package size of the installed system and is desirably easy to install.

SUMMARY OF THE INVENTION

Accordingly it is an advantage of the present invention to provide a vibration isolation system for an operating electric motor.

Another advantage of the present invention is to provide a low cost and lightweight vibration isolating system.

Another advantage of the present invention is to provide a vibration isolation system that does not significantly increase the overall package size of the installed system.

Another advantage of the present invention is to provide a vibration isolation system that is relatively easy to install.

Another advantage of the present invention is to provide sound dampening of audible noise produced by an operating electric motor.

The above and other advantages of the present invention are carried out in one form by a vibration isolation system that reduces the transmission of vibrations produced by an operating electric motor to a mounting surface at which the motor is mounted. The mounting surface has an opening through which a drive shaft of the motor extends. The isolation system includes a motor retaining assembly having an opening through which the drive shaft of the motor extends. A connector positions the motor retaining assembly in a fixed relation to the motor mounting surface. A motor isolating assembly is configured to extend circumferentially around an exterior surface of said motor. This isolating assembly has an opening through which the drive shaft extends.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
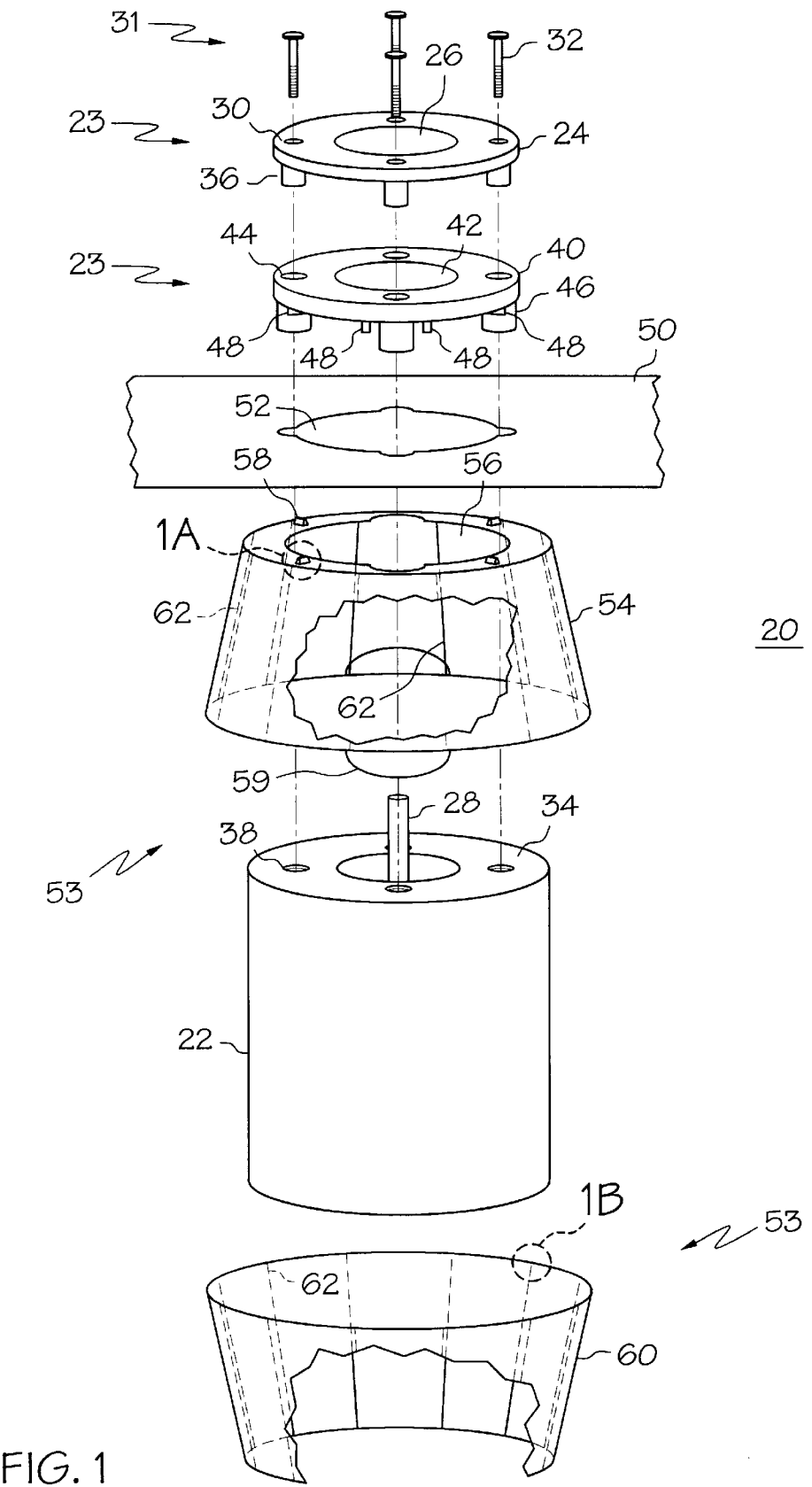
FIG. 1 shows an exploded, cutaway perspective drawing of a vibration isolation system for an electric motor in accordance with a first preferred embodiment of the present invention.
Figure 1A:
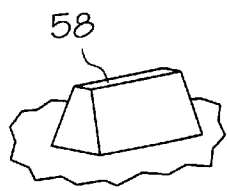
Figure 1B:
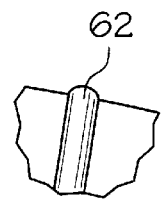

FIG. 1 shows an exploded, cutaway perspective drawing of a vibration isolation system 20 for an electric motor 22 in accordance with a first preferred embodiment of the present invention. For the embodiments shown in FIGS. 1–3, electric motor 22 is a blower motor for an automotive heating, ventilating and air conditioning system; however, this is no requirement of the present invention. FIG. 1 shows a motor retaining assembly 23 that has a retainer or retainer ring 24 with an opening 26. A drive shaft 28 of motor 22 extends through opening 26 when vibration isolation system 20 is coupled together. Retainer 24 also has a mounting hole 30 (four shown) that allows a connector 31 having a fastener 32 (four shown) to attach retainer 24 to a motor surface 34 through which drive shaft 28 of motor 22 extends. In this embodiment, retainer 24 is shown as being a circular ring but could just as easily be a square ring or any of a variety of other shapes. Retainer 24 has a cylindrical sleeve 36 (three shown) that surrounds mounting hole 30 and extends orthogonally from retainer 24. Sleeve 36 has an inner diameter larger than a diameter of fastener 32. For this embodiment, cylindrical sleeve 36 functions as a rigid spacer between retainer 24 and motor 22.

In one embodiment, fastener 32 is a male threaded coupler (i.e. a screw) that threads into a female threaded hole 38 (four shown) located on motor surface 34 of motor 22 for attaching retainer 24 to motor 22. The mounting screw passes through retainer mounting hole 30 and cylindrical sleeve 36 and attaches to motor surface 34. Those skilled in the art of fasteners will readily realize that connector 31 could be any of a variety of combinations of threaded couplings or other connecting systems as well. Moreover, any of a variety of other connectors, such as latches, clasps or any of a variety of press fit coupling systems, could be used to attach retainer 24 to motor 22. Of course, modification of connector 31 to any of these other types of fasteners may require reconfiguration of other system components as well.

FIG. 1 also shows retaining ring assembly 23 having a retaining ring isolator 40 with an opening 42 through which drive shaft 28 extends when vibration isolation system 20 is coupled together. Isolator 40 also has a mounting hole 44 (four shown) that is configured to accept cylindrical sleeve 36 of retainer 24. An isolator sleeve 46 (three shown) is configured to extend around cylindrical sleeve 36 and extend orthogonally away from isolator. To reduce vibrations from motor 22 and vibrations transmitted through fastener 32, a plurality of protrusions 48 (four shown) are located proximate fastener 32 and isolator sleeve 36. Protrusions 48 project outwardly from a motor-facing side of isolator 40. For this embodiment, protrusions 48 are configured to be wedge-shaped so as to resemble the shape of protrusions 58, an expanded detail of which is shown in FIG. 1.

A substantially flat mounting surface 50 at which motor 22 is mounted is shown having an opening 52 that is configured to accommodate drive shaft 28 and isolator 40. Mounting surface 50 is located between a motor isolating assembly 53 and isolator 40. Motor isolating assembly 53 has an upper motor cover 54 with an opening 56 that is also configured to accommodate drive shaft 28 and isolator sleeves 46. Upper motor cover 54 has a plurality of protrusions 58 (eight shown) that are located proximate fastener 32 and motor isolating assembly opening 56. Protrusions 58 project outwardly from an exterior drive shaft side of motor cover 54 and for this embodiment are configured to be wedge shaped protrusions (see expanded detail of 58 in FIG. 1). Motor cover 54 also has a tab 59 (two shown) at an opening opposite opening 56. Each tab 59 projects outwardly from an exterior surface of motor cover 54 to provide a gripping surface for installing motor cover 54 on motor 22. For the embodiment shown, motor isolating assembly 53 also has a lower motor cover 60. The two piece motor cover made up of upper and lower sections 54 and 60 promotes ease of installation, particularly when compared to a one piece cover that extends to cover the same amount of motor exterior surface. Lower motor cover 60 and upper motor cover 54 both have an interior surface with a plurality of protruding ridges 62 that extend in an axial direction with respect to motor 22 and are distributed about a circumference of each cover. These axially extending ridges reduce surface contact area between the exterior surface of the motor and the interior surface of the motor cover. The reduction in common surface area reduces the transmission of motor vibrations to the mounting surface. This reduction in common surface area and the axial configuration of the ridges further aids the installation of the motor cover by reducing surface drag or friction between the exterior surface of the motor and the interior surface of the motor cover.

Vibration isolation system 20 is coupled together by fitting retainer 24 into retaining ring isolator 40 and placing isolator 40 into mounting surface opening 52 such that protrusions 48 contact mounting surface 50. Also, upper motor cover 54 and lower motor cover 60 are positioned to surround motor 22 while protruding ridges 62 space the interior surface of motor covers 54 and 60 away from motor 22. Coupling is completed by fitting fasteners 32 through retainer mounting holes 30 and attaching fasteners 32 to threaded holes 38 such that protrusions 58 of upper motor cover 54 contact mounting surface 50. When vibration isolation system 20 is so coupled, protrusions 48, 58, and 62 provide a limited surface area common to motor 22 and mounting surface 50. This limited surface area is a reduction in the surface area conventionally available to conduct vibrations and thus provides a reduction in the transmission of motor vibrations.

Protrusions 48 and 58 are configured to be wedge shaped protrusions (see expanded detail of 58 in FIG.1) to further reduce the surface area common to motor 22 and mounting surface 50. However, protrusions 48 and 58 could just as well be any of a variety of shapes that reduce the common surface area between two surfaces. Moreover, protrusions 48 and 58 are shown located proximate fastener 32 but for other embodiments, protrusions 48 are distributed over the motor-facing side of isolator 40 and protrusions 58 are distributed over the exterior drive shaft side of motor cover 54.

In an alternate embodiment, the interior surface of motor covers 54 and 60 have a plurality of protrusions (not shown) that contact the exterior surface of motor 22 and are distributed around the circumference of the interior surface. These protrusions could be any of a variety of shapes known to minimize surface area contact. In another embodiment, upper motor cover 54 is extended to cover the full axial length of motor 22, leaving the bottom of motor 22 uncovered, eliminating lower motor cover 60. Surrounding motor 22 with upper motor cover 54 and lower motor cover 60 not only reduces transmission of motor vibration but also tends to dampen and/or absorb audible noise generated by motor 22. Desirably, isolator 40, upper motor cover 54 and lower motor cover 60 are made of a flexible material, such as rubber or a like synthetic material. A flexible material tends to further reduce or dampen motor vibration and noise.

Figure 2:
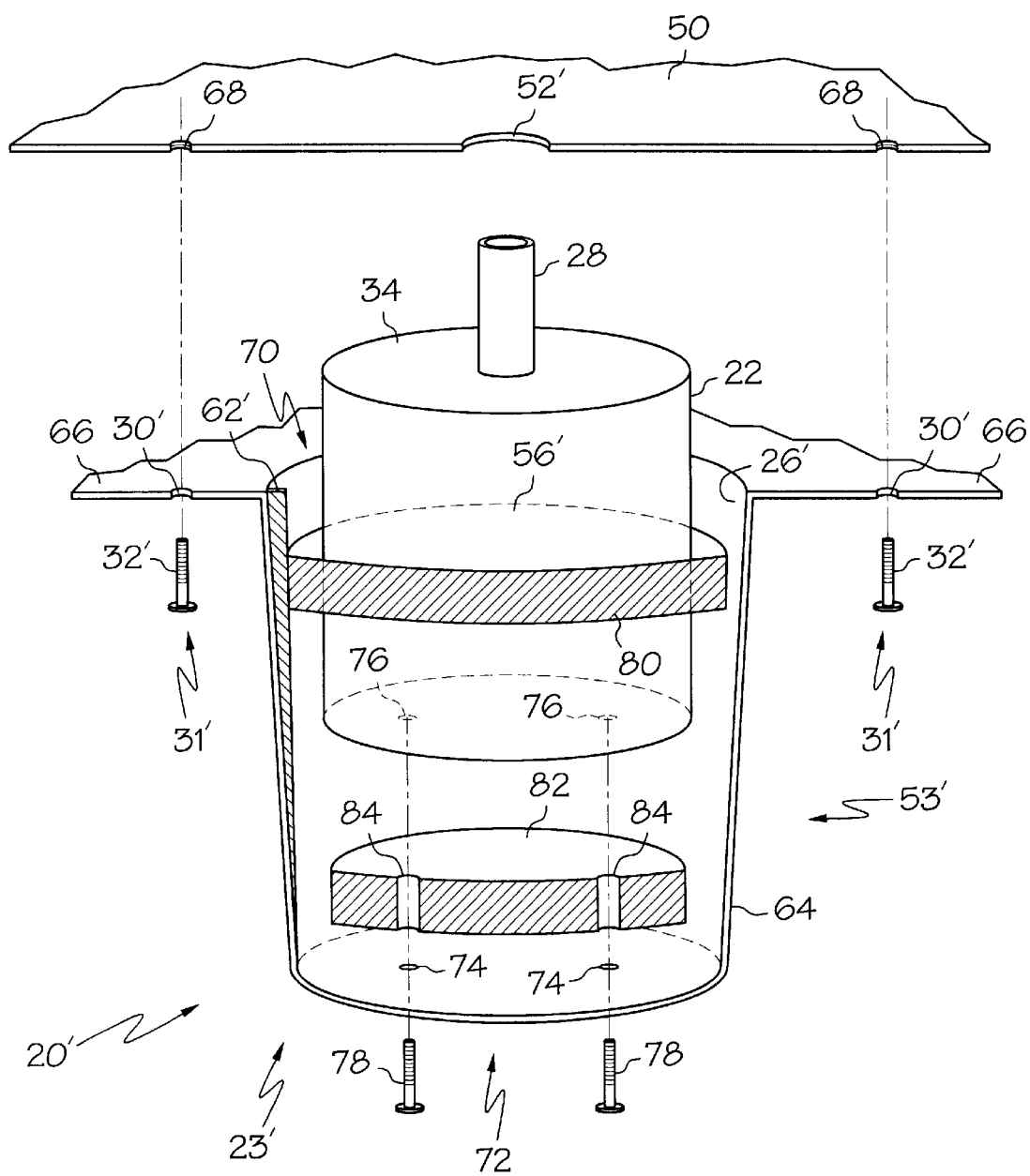
FIG. 2 shows an exploded, cutaway perspective drawing of a vibration isolation system for an electric motor in accordance with a second preferred embodiment of the present invention.

FIG. 2 shows an exploded, cutaway perspective drawing of a vibration isolation system 20' for electric motor 22 in accordance with a second preferred embodiment of the present invention. Mounting surface 50 has a mounting surface opening 52' to accommodate drive shaft 28 of motor 22. For this second preferred embodiment, a motor retaining assembly 23' is configured to hold motor 22 and an isolating assembly 53'. Retaining assembly 23' is a rigid housing 64 that has a flange 66 and a plurality of protruding ridges 62' (one shown) that are distributed around a circumference of an interior surface of housing 64. In this embodiment, a connector 31' uses fastener 32' (two shown) to pass through a retainer mounting hole 30' (two shown) in flange 66 and a surface mounting hole 68 (two shown) to attach rigid housing 64 to mounting surface 50. Those skilled in the art will realize that more than two fasteners could be used and that fastener 32' could be any of a variety of fasteners such as mounting screws, nuts and bolts, rivets and the like.

FIG. 2 shows a retaining assembly opening 26' at an open end 70 of housing 64. An opposite end 72 of housing 64 is shown having a motor fastening hole 74 (two shown) that aligns with a threaded hole 76 (two shown) in motor 22. For the embodiment shown, two screws 78 pass through motor fastening holes 74 and thread into threaded holes 76 to attach rigid housing 64 to motor 22. Those skilled in the art will realize that a different number of fasteners could be used as well as different types of fasteners as previously discussed.

In this second preferred embodiment, motor isolating assembly 53' is an isolating band 80 that has a width less than a length of motor 22 and extends around a circumference of motor 22 to form an isolating assembly opening 56'. Motor isolating assembly 53' also has an isolating pad 82. Isolating pad 82 has a fastening hole 84 (two shown) that aligns with fastening holes 74 and threaded holes 76 when isolating pad 82 is positioned between housing 64 and motor 22. For the embodiment shown, isolating pad 82 is a circular pad having a diameter approximately the same as a diameter of motor 22. Those skilled in the art will realize that the shape of isolating pad 82 could be any of a variety of shapes and that by changing the shape of isolating pad 82, such as reducing its diameter, isolating pad fastening holes 84 could be eliminated.

FIG. 2 shows exemplary protruding ridge 62' as protruding outwardly at open end 70 and tapering inwardly to an interior surface of housing 64 at opposite end 72. In other words, the width of ridge 62' is greater at open end 70 than at opposite end 72. In this embodiment, ridge 62' not only acts to reduce the common surface area between motor 22 and housing 64, as discussed above in connection with the first embodiment, but also holds isolating band 80 and motor 22 in a fixed relation to housing 64 and mounting surface 50. Moreover, ridge 62' is shown to extend axially with respect to motor 22, reducing surface friction between housing 64 and band 80 when motor 22 and isolating band 80 are installed in housing 64. In one embodiment, isolating band 80 and pad 82 each have an adhesively backed side that adheres to the exterior surface of motor 22. The dimensions and density of isolating band 80 and pad 82 are substantially determined by the type of isolating material that is selected. The type of isolating material selected can be any of a variety of materials, such as rubber, foam and the like. Those skilled in the art will realize that selection of an appropriate isolating material is made in consideration of requirements or needs as determined for each application.

Vibration isolation system 20' shown in FIG. 2 is coupled together by adhering adhesively backed isolating band 80 to the exterior circumference of motor 22 and adhering adhesively backed isolating pad 82 to motor 22 such that isolating pad fastening holes 84 align with threaded holes 76 of motor 22. Thereafter, motor 22 with band 80 and pad 82 are positioned in housing 64 such that threaded holes 76 and fastening holes 84 align with motor fastening holes 74 of housing 64. Motor 22 is held in a fixed relation to housing 64 by protruding ridges 62' that contact isolating band 80 and by fasteners 78 that pass through motor fastening holes 74 and isolating pad fastening holes 84 to attach to threaded holes 76 of motor 22. Coupling is completed by attaching fasteners 32' to housing 64 and mounting surface 50 when drive shaft 28 of motor 22 is positioned to extend through mounting surface opening 52' and mounting holes 30' match with surface mounting holes 68.

Figure 3:
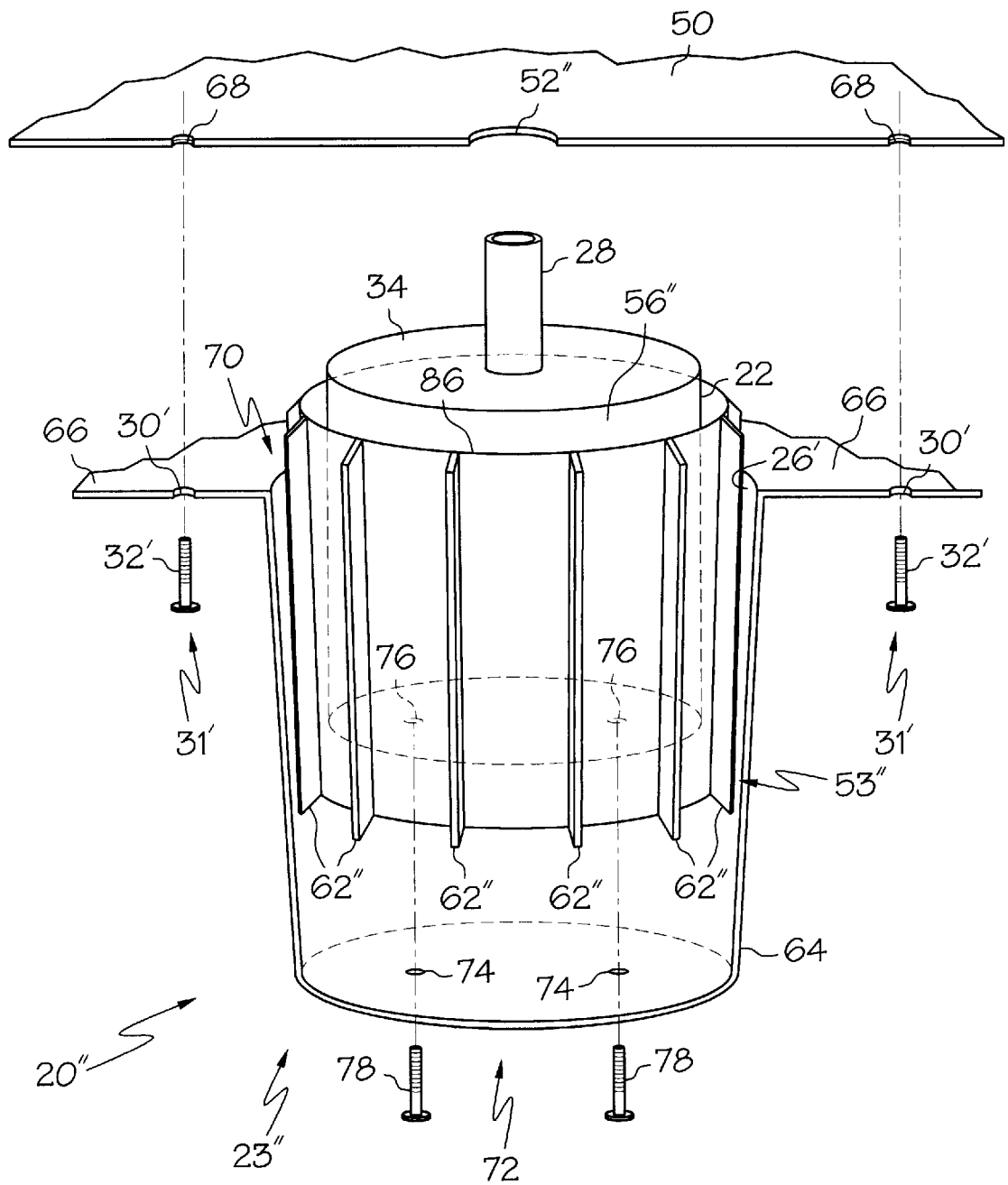
FIG. 3 shows an exploded, cutaway perspective drawing of a vibration isolation system for an electric motor in accordance with a third preferred embodiment of the present invention.

FIG. 3 shows an exploded, cutaway perspective drawing of vibration isolation system 20" for electric motor 22 in accordance with a third preferred embodiment of the present invention. Mounting surface 50 has a mounting surface opening 52" to accommodate drive shaft 28 of motor 22. For this third preferred embodiment, motor retaining assembly 23' is configured to hold motor 22 and an isolating assembly 53'. Retaining assembly 23' includes rigid housing 64 with flange 66. Connector 31' uses fastener 32' (two shown) to pass through retainer mounting hole 30' (two shown) in flange 66 and surface mounting hole 68 (two shown) to attach rigid housing 64 to mounting surface 50. Those skilled in the art will realize that more than two fasteners could be used and that fastener 32' could be any of a variety of fasteners such as mounting screws, nuts and bolts, rivets and the like.

FIG. 3 shows retaining assembly opening 26' as at an open end 70 of housing 64. Opposite end 72 of housing 64 is shown having motor fastening hole 74 (two shown) that aligns with threaded hole 76 (two shown) in motor 22. For the embodiment shown, two screws 78 pass through motor fastening holes 74 and thread into threaded holes 76 to attach rigid housing 64 to motor 22. Those skilled in the art realize that a different number of fasteners could be used as well as different types of fasteners as previously discussed.

In this third preferred embodiment, motor isolating assembly 53" is an isolating shroud 86 that has a width less than a length of motor 22 and substantially extends around a circumference of motor 22 to form an isolating assembly opening 56". Isolating shroud 86 has a plurality of protruding ridges 62 (five shown) that extend axially with respect to motor 22. FIG. 3 shows ridges 62" being distributed around a circumference of an exterior surface of isolating shroud 86 so that ridges 62" contact the interior surface of housing 64. Ridges 62" act to reduce the common surface area between motor 22 and housing 64, as discussed above. In addition, ridges 62" also tend to hold isolating shroud 86 and motor 22 in a fixed relation to housing 64 and mounting surface 50. Moreover, ridges 62" extend axially with respect to motor 22 to reduce the surface friction between housing 64 and shroud 86 when motor 22 and isolating shroud 86 are installed in housing 64. In one embodiment, isolating shroud 86 has a side opposite its ridged side that is adhesively coated and adheres to the exterior surface of motor 22.

In another embodiment, ridges 62 are distributed around the circumference of an interior surface of isolating shroud 86 and contact the exterior surface of motor 22. This embodiment resembles motor covers 54 and 60 (see FIG. 1) with inwardly projecting ridges 62. However, shroud 86 may wrap around motor 22 rather than be fitted over motor 22. The dimensions and density of isolating shroud 86 are substantially determined by the type of isolating material that is selected. The type of isolating material selected can be any of a variety of flexible materials, such as rubber, foam and the like. Those skilled in the art will realize that selection of an appropriate isolating material is made in consideration of the requirements or needs as determined for each application.

In the embodiment of vibration isolation system 20" shown in FIG. 3, system 20" is coupled together by adhering adhesively backed isolating shroud 86 to the exterior circumference of motor 22. Thereafter, motor 22 with isolating shroud 86 is positioned in housing 64 such that threaded holes 76 align with motor fastening holes 74 of housing 64. Motor 22 is held in a fixed relation to housing 64 by protruding ridges 62" of isolating shroud 86 that contact the interior surface of housing 64 and by fasteners 78 that pass through motor fastening holes 74 and attach to threaded holes 76 of motor 22. Coupling is completed by attaching fasteners 32' to housing 64 and mounting surface 50 when drive shaft 28 of motor 22 is positioned to extend through mounting surface opening 52 and mounting holes 30' match with surface mounting holes 68.

In summary, the present invention provides a low cost, lightweight, vibration isolation system that significantly reduces the transmission of vibrations from an operating electric motor without significantly increasing the overall package size of the installed system and that is easy to install. The vibration isolation systems use protrusions to reduce the amount of surface area common to motor 22 and mounting surface 50. Limiting the surface area through which vibrations can be transmitted and substantially surrounding motor 22 with vibration absorbing covers, shrouds, and/or housings reduces the transmission of vibrations from motor 22 to mounting surface 50.

Installation efforts are minimized in the first preferred embodiment by a two piece motor cover, with the upper motor cover having tabs on its outer surface that provide a gripping surface for cover installation. Furthermore, the motor covers are configured with ridges that extend axially with respect to the motor. Being so configured, these ridges tend to reduce surface drag encountered during cover installation. Installation efforts are minimized in the second preferred embodiment when the isolating band and isolating pad are adhesively backed, providing easy attachment to the exterior surface of the motor. The protruding ridges of the housing extend axially with respect to the motor, allowing easy fitting of the motor and isolating band into the housing. Installation efforts are minimized in the third preferred embodiment when the isolating shroud is adhesively backed, providing easy attachment to the exterior surface of the motor. The protruding ridges of the shroud extend axially with respect to the motor, allowing easy fitting of the motor and shroud into the housing.

Although the preferred embodiments of the invention have been illustrated and described in detail, it will be readily apparent to those skilled in the art that various modifications may be made therein without departing from the spirit of the invention or from the scope of the appended claims.

What is claimed is:

1. A vibration isolation system for reducing the transmission of vibrations produced by an operating electric motor to a mounting surface for said motor, said mounting surface having an opening to accommodate passage of a drive shaft of said motor, and said vibration isolation system comprising:

a motor retaining assembly having an opening configured to accommodate passage of said drive shaft;

a connector configured to hold said motor retaining assembly in fixed relation with said motor mounting surface; and a flexible motor isolating assembly configured to extend circumferentially around an exterior surface of said motor, said motor isolating assembly having an opening for accommodating passage of said drive shaft, and said motor isolating assembly including a motor cover having an interior surface from which a plurality of ridges project, said ridges being distributed around a circumference of said interior surface and extending in an axial direction along said interior surface for contacting said exterior surface of said motor.

2. A vibration isolation system for reducing the transmission of vibrations produced by an operating electric motor to a mounting surface for said motor, said mounting surface having an opening to accommodate passage of a drive shaft of said motor, a drive shaft surface of said motor having at least two threaded holes, and said vibration isolation system comprising:

a motor retaining assembly having an opening configured to accommodate passage of said drive shaft, said motor retaining assembly including:

a retainer ring having a ring opening configured to accommodate passage of said drive shaft and having at least two ring mounting holes proximate said ring opening; and a flexible retaining ring isolator having an isolator opening configured to accommodate passage of said drive shaft and having at least two isolator mounting holes proximate said isolator opening, and said retaining ring isolator including a motor-facing side having a plurality of isolator protrusions projecting therefrom;

a flexible motor isolating assembly configured to extend circumferentially around an exterior surface of said motor, said isolating assembly including a motor cover having at least one opening configured to accommodate passage of said drive shaft and said retaining ring isolator, and said motor cover including an exterior drive shaft side having a plurality of motor cover protrusions projecting therefrom; and a connector configured to hold said motor retaining assembly in fixed relation with said motor mounting surface, said connector including at least two mounting screws configured to pass through said ring and said isolator mounting holes of said motor retaining assembly and fasten to said at least two threaded holes on said motor such that said mounting surface is located between said motor retaining assembly and said motor isolating assembly, wherein said isolator and said motor cover protrusions are configured to flexibly contact said mounting surface to reduce the transmission of said vibrations.

3. A vibration isolation system as claimed in claim 2 wherein said isolator and said motor cover protrusions are wedge shaped protrusions.

4. A vibration isolation system for reducing the transmission of vibrations produced by an operating electric motor to a mounting surface for said motor, said mounting surface having an opening to accommodate passage of a drive shaft of said motor, and said vibration isolation system comprising:

a motor retaining assembly including:

a substantially rigid housing for holding said motor, said rigid housing having an open end configured to accommodate passage of said drive shaft and having at least two motor fastening holes located at an end opposite said open end;

at least two screws configured to pass through said at least two motor fastening holes of said rigid housing in order to attach said rigid housing to said motor; and a plurality of protruding ridges distributed around a circumference of an interior surface of said rigid housing, said protruding ridges protruding from said interior surface at a first width proximate said open end and tapering toward said interior surface to a second width proximate said said opposite end, said second width being less than said first width a connector configured to hold said motor retaining assembly in fixed relation with said motor mounting surface; and a flexible motor isolating assembly configured to extend circumferentially around an exterior surface of said motor, said flexible motor isolating assembly including:

an isolating band configured to extend around said exterior surface of said motor; and an isolating pad having at least two fastening holes therein, said isolating band and said isolating pad being configured for positioning between said rigid housing and said motor, and said at least two fastening holes being configured to accommodate passage of said at least two screws of said motor retaining assembly.

5. A vibration isolation system for reducing the transmission of vibrations produced by an operating electric motor to a mounting surface for said motor, said mounting surface having a surface opening to accommodate passage of a drive shaft of said motor, and said vibration isolation system comprising:

a motor retaining assembly including:

a substantially rigid housing for holding said motor, said rigid housing having an open end configured to accommodate passage of said drive shaft and having at least two motor fastening holes located at an end opposite said open end; and at least two screws configured to pass through said at least two motor fastening holes of said rigid housing in order to attach said rigid housing to said motor;

a connector configured to hold said motor retaining assembly in fixed relation with said motor mounting surface; and a flexible motor isolating assembly configured to extend circumferentially around an exterior surface of said motor, said motor isolating assembly including a flexible isolating shroud having a plurality of ridges distributed on an exterior surface of said shroud, said ridges being configured to contact an interior surface of said rigid housing.

6. A vibration isolation system for reducing the transmission of vibrations produced by an operating electric motor to a mounting surface for said motor, said mounting surface having a surface opening to accommodate a drive shaft of said motor, said isolation system comprising:

a motor retaining assembly having an opening configured to accommodate said drive shaft;

a connector configured to hold said motor retaining assembly in fixed relation with said motor mounting surface; and a flexible isolating shroud configured to extend circumferentially around an exterior surface of said motor, said flexible isolating shroud including a plurality of ridges distributed around a circumference of said isolating shroud.

7. A vibration isolation system as claimed in claim 6 wherein said plurality of ridges are configured to extend in an axial direction relative to said flexible isolating shroud and project from an interior surface of said flexible isolating shroud.

8. A vibration isolation system as claimed in claim 6 wherein said motor retaining assembly comprises a rigid housing configured to hold said motor and said plurality of ridges are located proximate an exterior surface of said flexible isolating shroud such that said ridges contact an interior surface of said rigid housing.

* * * * *